United States Patent [19]
Narayanaswami et al.

[11] Patent Number: 6,052,128
[45] Date of Patent: Apr. 18, 2000

[54] METHOD AND APPARATUS FOR CLIPPING CONVEX POLYGONS ON SINGLE INSTRUCTION MULTIPLE DATA COMPUTERS

[75] Inventors: Chandrasekhar Narayanaswami, Wilton, Conn.; Bengt-Olaf Schneider, Yorktown Heights, N.Y.; James Lewis van Welzen, Raleigh, N.C.

[73] Assignee: International Business Machines Corp., Armonk, N.Y.

[21] Appl. No.: 08/898,747

[22] Filed: Jul. 23, 1997

[51] Int. Cl.7 .................................................... G06T 15/30
[52] U.S. Cl. .............................................................. 345/434
[58] Field of Search ................................... 345/434, 441, 345/423, 427

[56] References Cited

U.S. PATENT DOCUMENTS

| | | | |
|---|---|---|---|
| 3,816,726 | 6/1974 | Sutherland | 345/434 |
| 5,559,937 | 9/1996 | Takeda | 345/434 |
| 5,777,625 | 7/1998 | Rossin | 345/434 |
| 5,877,773 | 3/1999 | Rossin | 345/434 |

OTHER PUBLICATIONS

Scott Whitman, "A Load Balanced SIMD Polygon Renderer," Parallel Rendering Symposium, pp. 63–69, Jan. 1995.

Ivan E. Sutherland et. al., "Reentrant Polygon Clipping," Communications of the ACM, pp. 32–42, Jan. 1974.

Casey D. Doyle, "Computer Dictionary 2nd Edition, the Comprehensive Standard for Business, School, Library, and Home," Microsoft Press, 1994.

Primary Examiner—Ba Huynh
Assistant Examiner—Thomas J Joseph
Attorney, Agent, or Firm—Douglas W. Cameron; Anne Vachon Dougherty

[57] ABSTRACT

An image to be clipped is decomposed into its edges and the edges simultaneously clipped by multiple execution units of a SIMD computer along pairs of parallel clip planes. Successive parallel operations are performed on polygons recomposed using the clipped output edges, until all clipping has been performed.

11 Claims, 7 Drawing Sheets

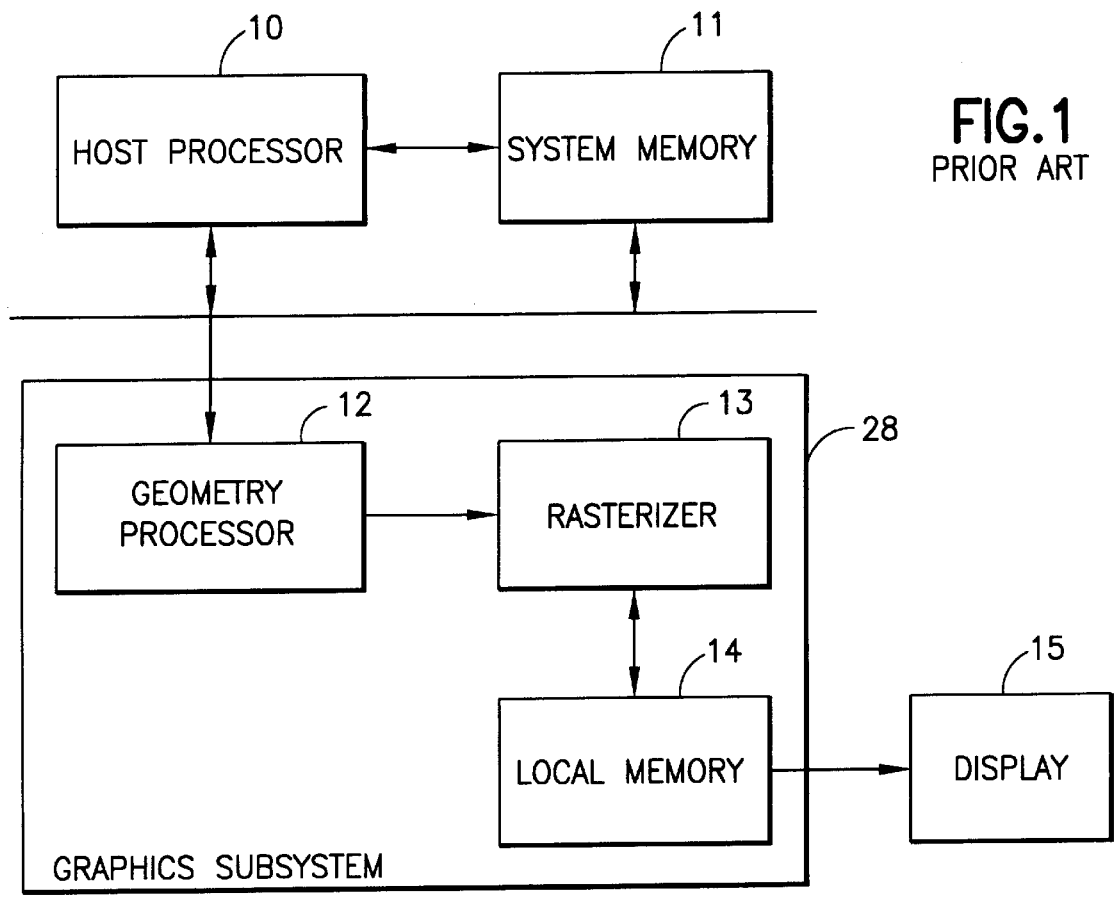
FIG.1
PRIOR ART
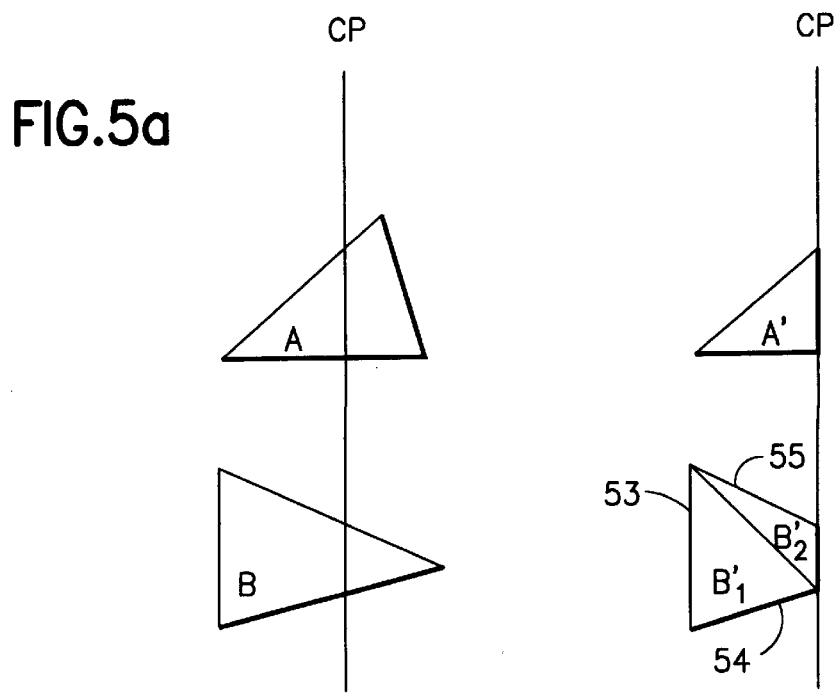
FIG.5a
FIG.5b

METHOD AND APPARATUS FOR CLIPPING CONVEX POLYGONS ON SINGLE INSTRUCTION MULTIPLE DATA COMPUTERS

FIELD OF THE INVENTION

This invention relates to computer graphics rendering systems and more specifically to a method and apparatus for clipping convex polygons utilizing a single instruction multiple data computer.

BACKGROUND OF THE INVENTION

In the art of computer graphics, rendering of a primitive into an image in a three-dimensional graphics system requires a series of transformation steps. Generally, the Host Processor 10, of a system of the type illustrated in FIG. 1, will retrieve information describing the primitive from the System Memory 11 and provide same to the Graphics Subsystem 18. In the Graphics Subsystem, the Geometry Processor will perform a number of operations on the retrieved information in order to convert the information into a three-dimensional computer graphic. Once the geometry operations have been completed, the resulting representation of the image is rasterized in Rasterizer 13 and stored in the Local Memory 14 until it is read out of the Local Memory for display at Display Monitor 15. The series of geometric transformation operations include operations shown in the representative process flow of FIG. 2.

FIG. 2 shows that the original graphic information, described by application 20 in model coordinates, is first transformed into work coordinates via the Model Transformation step 21, whereby transformation matrices are applied to the primitive, thereby transforming it into a unified coordinate system describing the position of all objects in the scene, referred to as world coordinates. At step 22, the primitive's world coordinates are further processed in the View Transformation step to render the image in eye coordinates, as if viewed from a single vantage point with the human eye as the point of origin of the coordinate system.

The eye coordinates are next operated on in a way to add lighting and color to the coordinates, in the Lighting step 23. To this point in the graphics rendering process, all of the operations have simply been done on the Cartesian coordinates. In the Perspective Transformation step 24, the space is transformed into a box, such that the shape of the view volume is transformed to a normalized view volume in which the view plane is located at z=D and the eye at z=O. Perspective coordinates are then mapped into device coordinates in the Perspective Division step 25, yielding device coordinates which can be rasterized for display. The Rasterization processing breaks the display space down into pixels which must be turned on, where image components are present, and pixels which must be turned off, in image background areas.

After converting the image information into device coordinates, it is necessary to clip the image with respect to the view fustrum (i.e., field of view). Clipping is performed as step 26 prior to Rasterization at step 27. FIG. 3 provides a schematic illustration of the view fustrum 30 with several objects inside and outside of its boundaries. Objects, such as 31, which fall completely outside of the view volume are discarded from further processing ("trivial rejection"). Objects, such as 32, which fall entirely within the view volume remain unchanged and are sent directly to the rasterization subsystem ("trivial acceptance"). Objects, 33 and 34, that intersect the boundary of the view volume, however, must be clipped against the view volume boundaries (also known as "clip planes"), such that those objects are split into two portions. Those portions of split or clipped objects which fall without the view volume are discarded, while the portions inside of the view volume are sent to the rasterizer. As is well known in the art, it is most advantageous to perform clipping on triangulated image components. With all vertices of the triangulated image lying in one plane, it is only necessary to know the vertices to perform clipping, without having to operate on each portion of the image volume lying within the vertices.

Clip testing, (i.e., determining whether a triangle can be trivially accepted or rejected) is commonly performed using clip codes for the triangle vertices. Clip codes contain one OUT bit for each clipping plane. The OUT bit is set if the vertex is outside the clipping plane associated with that bit. FIG. 4 shows a two-dimensional example of how clip codes are assigned to different regions formed by the clip planes 41–44. A triangle can be trivially accepted if the bitwise OR of the outcodes of all vertices is 00 . . . 0. A triangle can be trivially rejected if the bitwise AND of the outcodes of all vertices is not 00 . . . 0.

If a triangle cannot be trivially accepted or rejected, it needs to be clipped against the clip planes. A technique frequently used is described in *Reentrant Polygon Clipping*, Suntherland and Hodgman, CACM, Vol. 17, pages 32–42, (1974). The triangle is clipped successively against each clip boundary. Clipping is performed by determining the intersection of the triangle edges with the boundary. The intersection points with the boundary form new vertices with the clipped triangle(s). If two vertices lie outside of the clipping boundary, only one triangle is produced by the clipping step, as shown for image 50 in FIG. 5A which is clipped to triangle 51 of FIG. 5B. If only one vertex is clipped by the clipping plane, such as is shown for triangle 52 of FIG. 5A, two vertices are produced by the clipping step, shown as polygon 53 of FIG. 5B, which polygon is decomposed into triangles 54 and 55. Clipping of the resulting triangles is then performed with respect to each of the other clipping planes.

FIG. 6 shows a flow diagram describing the steps involved in clipping a triangle. The triangle is provided for processing at step 60, after which the outcodes are computed for all vertices of the triangle, at step 61. If the outcodes indicated that all vertices are outside of the clip planes, then the triangle is trivially rejected at step 62. If not trivially rejected, the determination is made at step 63 as to whether all outcodes are within all clip planes for trivial acceptance of the triangle. For any remaining triangles, clipping is performed at step 64 along a first clip plane, followed by clipping along an adjacent plane, etc.

Assuming a single instruction multiple data (SIMD) computer, where one set of instructions may be applied to different data in parallel by a plurality of the computer engines, the outcode analysis (i.e., comparisons) may be run in parallel on more than one of the SIMD engines. Similarly, once it has been determined by the control processor that clipping is necessary, the computationally intensive clipping steps may be performed in more than one engine at a time. However, to shift from one set of instructions to another (e.g., from outcode assignment to clipping for a single triangle along one plane), where both data and instructions must be retrieved from caches, severely taxes the resources of the SIMD computer, both in computational time and in complexity, even giving rise to invalidation of the contents of the instruction cache necessitating re-loading from main memory. Since the shifting from outcode analysis instruction to clipping instruction may be repeated many times as the contents of an image are evaluated along the six clipping planes, the process becomes unduly long and complex.

What is needed, therefore, is a method for providing clipping of transformed convex polygons along clip planes which can be efficiently and effectively conducted on a SIMD computer.

What is additionally needed is a method for providing clipping of transformed convex polygons along clip planes which maximizes utilization of SIMD engines between instructions.

SUMMARY OF THE INVENTION

These and other objectives are realized by the present invention wherein the graphic information to be clipped is decomposed into its edges and the edges simultaneously clipped by multiple execution units of a SIMD computer along pairs of parallel clip planes. Successive parallel operations are performed on polygons recomposed using the clipped output edges, until clipping against all clip planes has been performed.

BRIEF DESCRIPTION OF THE DRAWINGS

The invention will now be described with specific reference to the appended drawings wherein:

FIG. 1 provides a schematic illustration of the apparatus used for converting input image information into three-dimensional computer graphics;

FIGS. 5A and 5B illustrate image objects before and after clipping along the illustrated clip plane;

DESCRIPTION OF THE PREFERRED EMBODIMENT

In accordance with the present invention, efficient clipping of polygons on a SIMD computer is realized by clipping the edges in parallel, ideally against parallel clip plane pairs. The inventive process utilizes the SIMD computer fully if the number of edges in the polygon to be clipped equals the number of execution units, or engines, available to the SIMD computer. If there are fewer edges in the polygon than there are execution units, the SIMD engines will not be utilized fully. If, however, there are at least twice as many execution units as there are edges, the SIMD can process two clip planes (CPs) at the same time. The CP pairs being analyzed at the same time must not intersect inside of the polygon being clipped, in order to avoid introduction of extra vertices at the intersection of the clip planes. This condition can be easily met if the clip planes are parallel planes. If the clip planes are not parallel (e.g., X or Y clip planes), it must be ensured that there is no intersection point inside of the clip volume. This may be done by clipping against the NEAR (i.e., the Z-plane nearest to the eye) plane first, which will clip off intersections between the X and Y clip planes. As clip volume, or the view volume, progressively shrinks with each clipping operation against a particular CP pair, the remaining CP pairs must have intersections outside of the clip volume.

Figure 2:
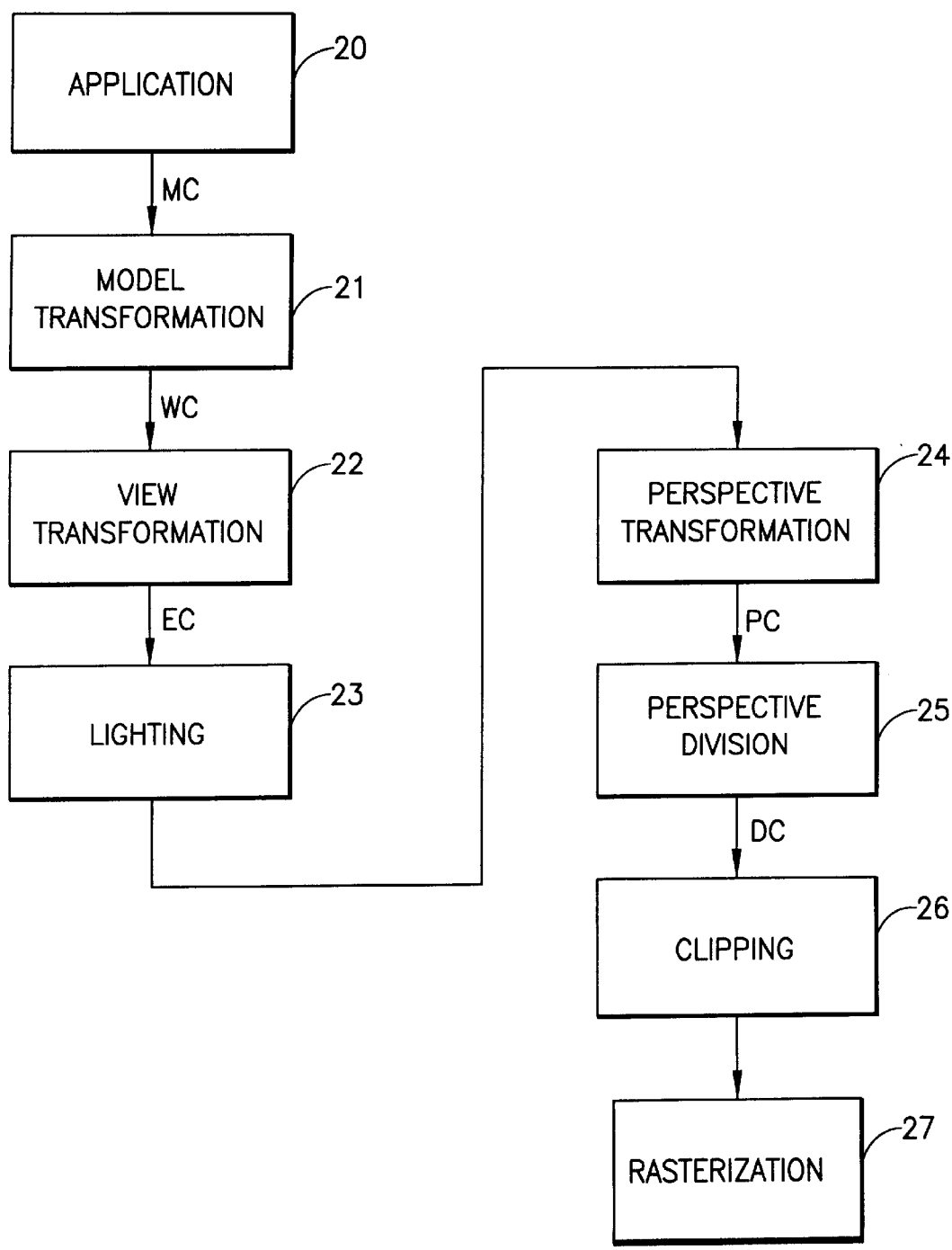
FIG. 2 provides a representative process flow utilized for converting input graphic information into three-dimensional computer graphic images.
Figure 3:
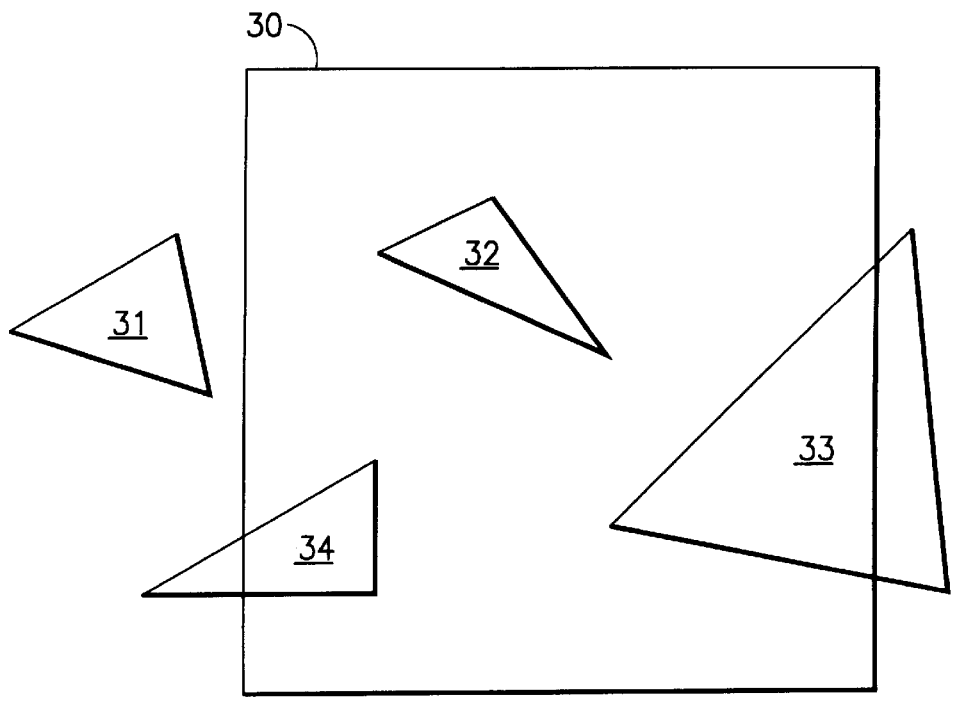
FIG. 3 provides a schematic illustration of the view fustrum 30 with several objects inside and outside of its boundaries.
Figure 4:
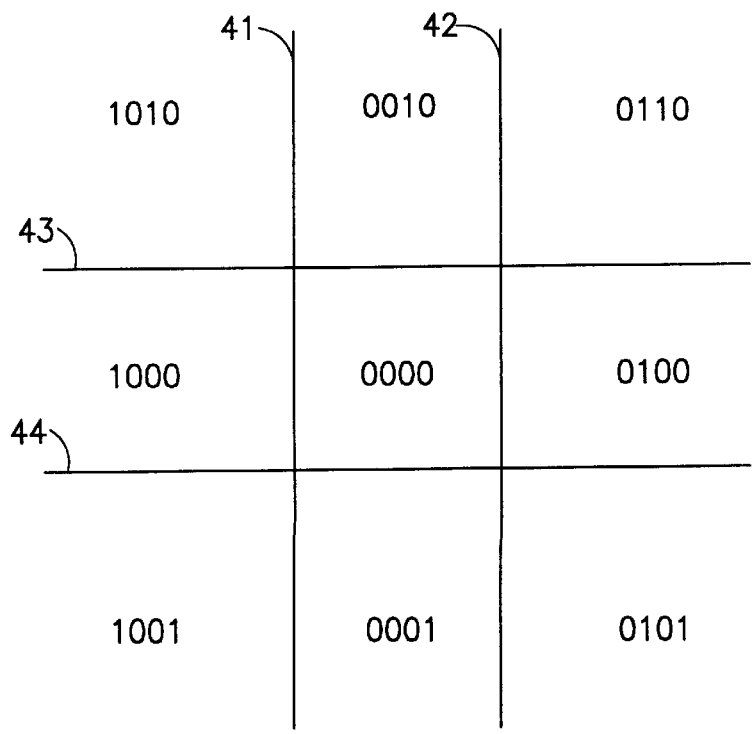
FIG. 4 shows a two-dimensional example of how clip codes are assigned to different regions formed by the clip planes.
Figure 6:
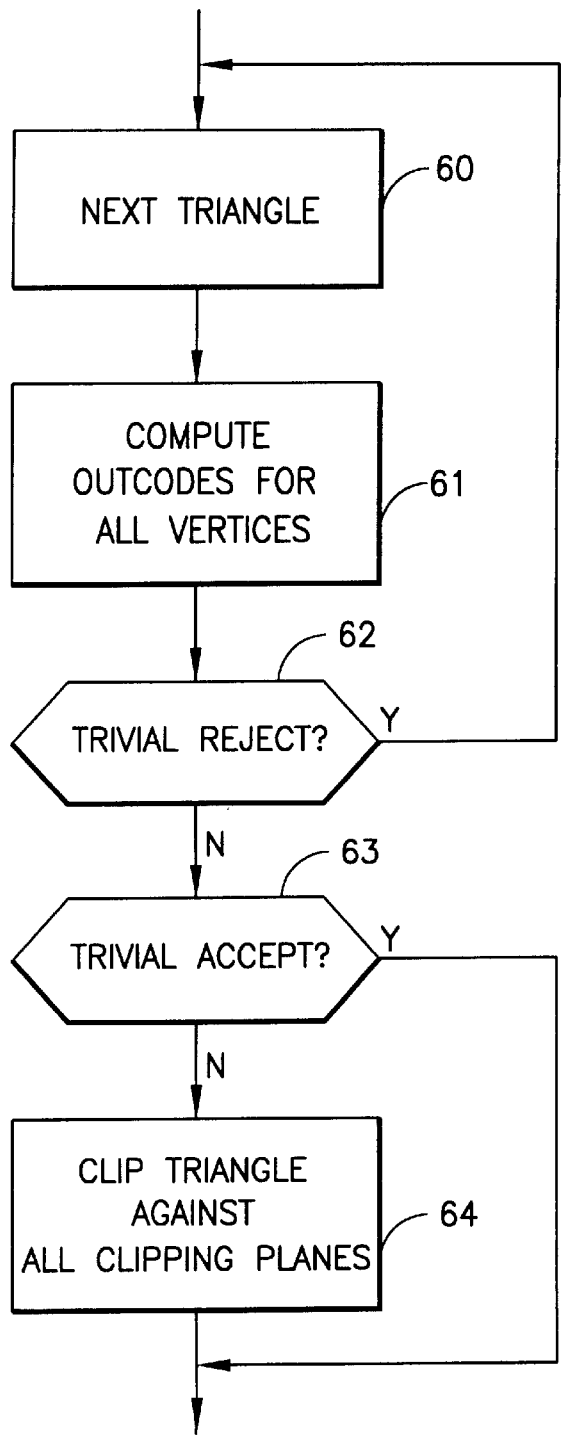
FIG. 6 shows a flow diagram describing the steps involved in clipping a triangle.
Figure 7:
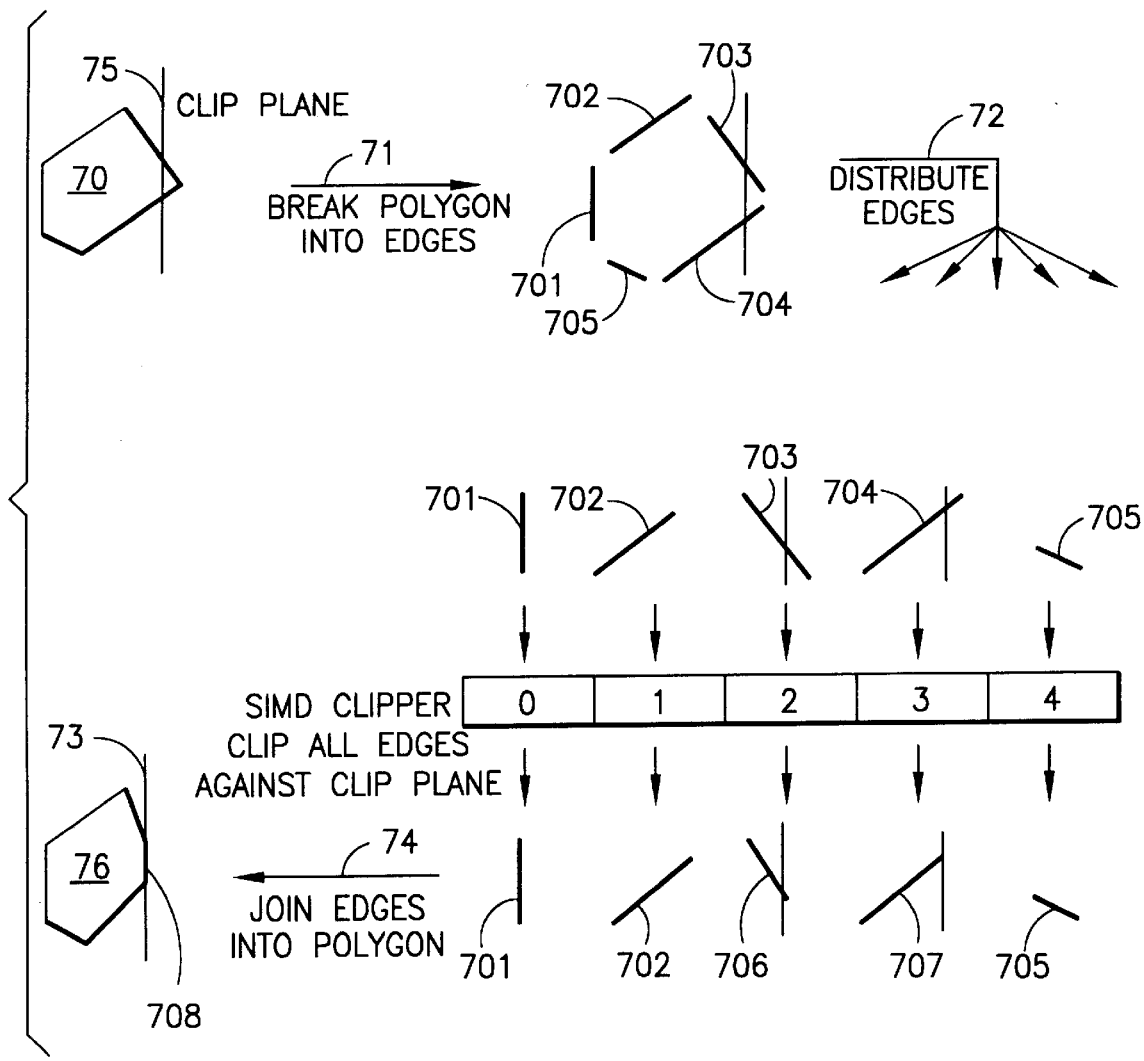
FIG. 7 illustrates the present inventive steps of clipping a polygon using a SIMD computer.

FIG. 7 illustrates the steps of the present invention for clipping a polygon 70 along clip plane 75 using a SIMD computer. The first step, which is performed by the control processor, or controller of the SIMD computer, it to break the polygon into its edges, as shown in step 71. Thereafter, the controller distributes each edge into one of the SIMD execution units, such that edge 701 is processed at unit 0, 702 at unit 1, 703 at unit 2, 704 at unit 3, and 705 at unit 4. Each unit clips the edge along the relevant clip plane, in step 73. Two of the edges of polygon 70, 703 and 704 operated on by execution units 2 and 3 respectively, intersect clip plane 75. Therefore, those edges require clipping, while the edges fed to the remaining execution units require no clipping. As shown in the Figure, execution unit 2 clips input edge 703 to produce output edge 706. Similarly, execution unit 3 clips input edge 704 to produce output edge 707. After clipping by the SIMD execution units, the controller recomposes the image, at step 74, utilizing the edges output from the SIMD engine, to form polygon 76. For each edge in the output polygon, the start point of the edge is included if it is inside of the clip plane. The end point of the edge is only included if it is at an intersection point of the edge with a clip plane.

Pseudo-code for generating the output edge file contents is as follows:

```
Reset_vertex_list
convert the polygon to edges
parbegin // SIMD computation
    foreach (edge e in polygon)
        computer intersection of e with CP
        computer edge attributes at intersection
        clip the edge at the intersection point
    endfor
parend
foreach (edge e in polygon)
    if (startpoint inside clipplane)
        Add startpoint to output polygon
        if (endpoint is an intersection point)
            Add endpoint to polygon
endfor.
```

As mentioned above, it is preferable to clip against two parallel clip planes at one time, if there are enough execution units available. Assuming a SIMD having eight execution units, simultaneous clipping can be conducted for parallel clip planes when the polygon has four or fewer edges.

Figure 8A:
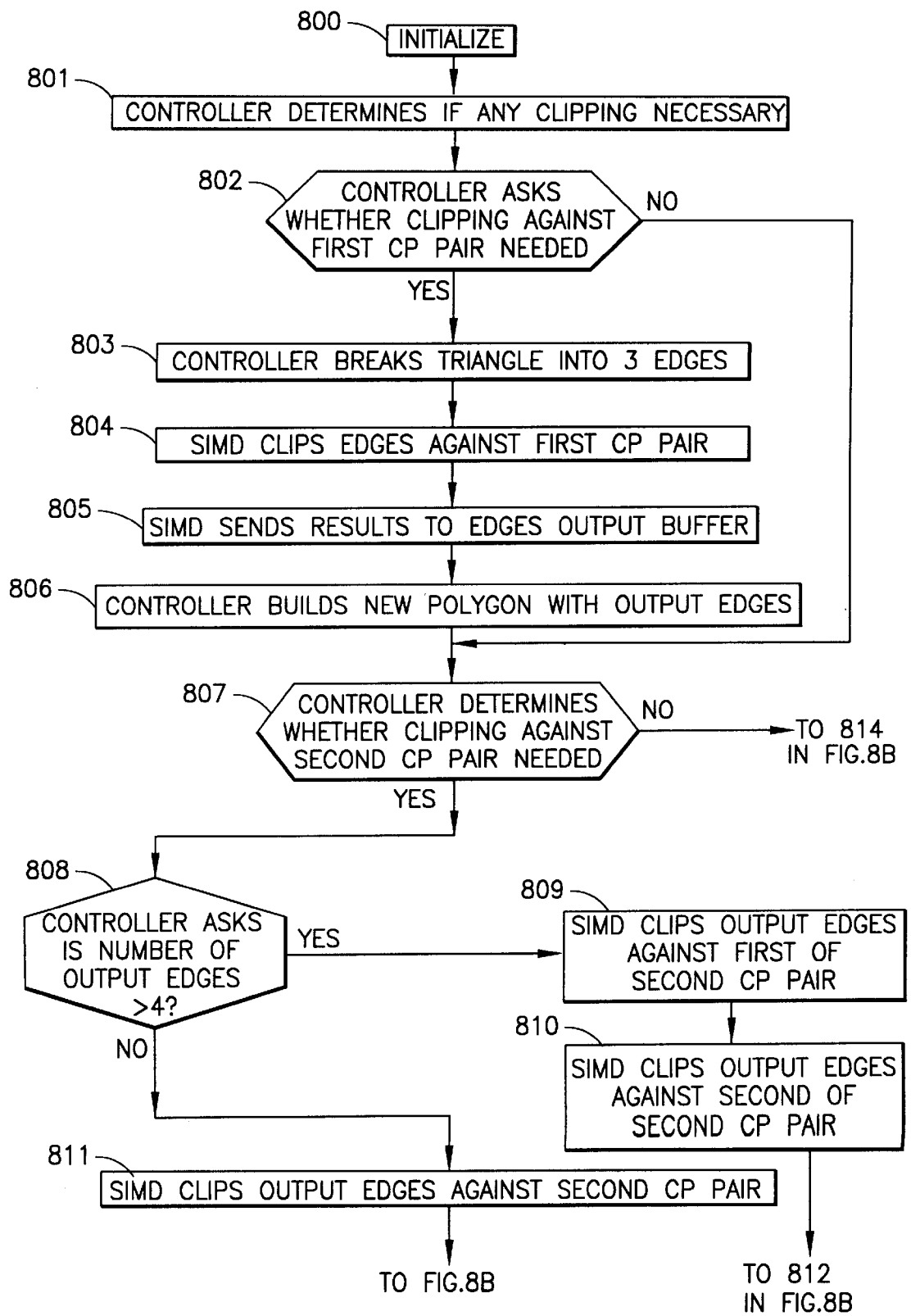
FIG. 8A and 8B provide a representative process flow for implementation of the present invention.
Figure 8B:
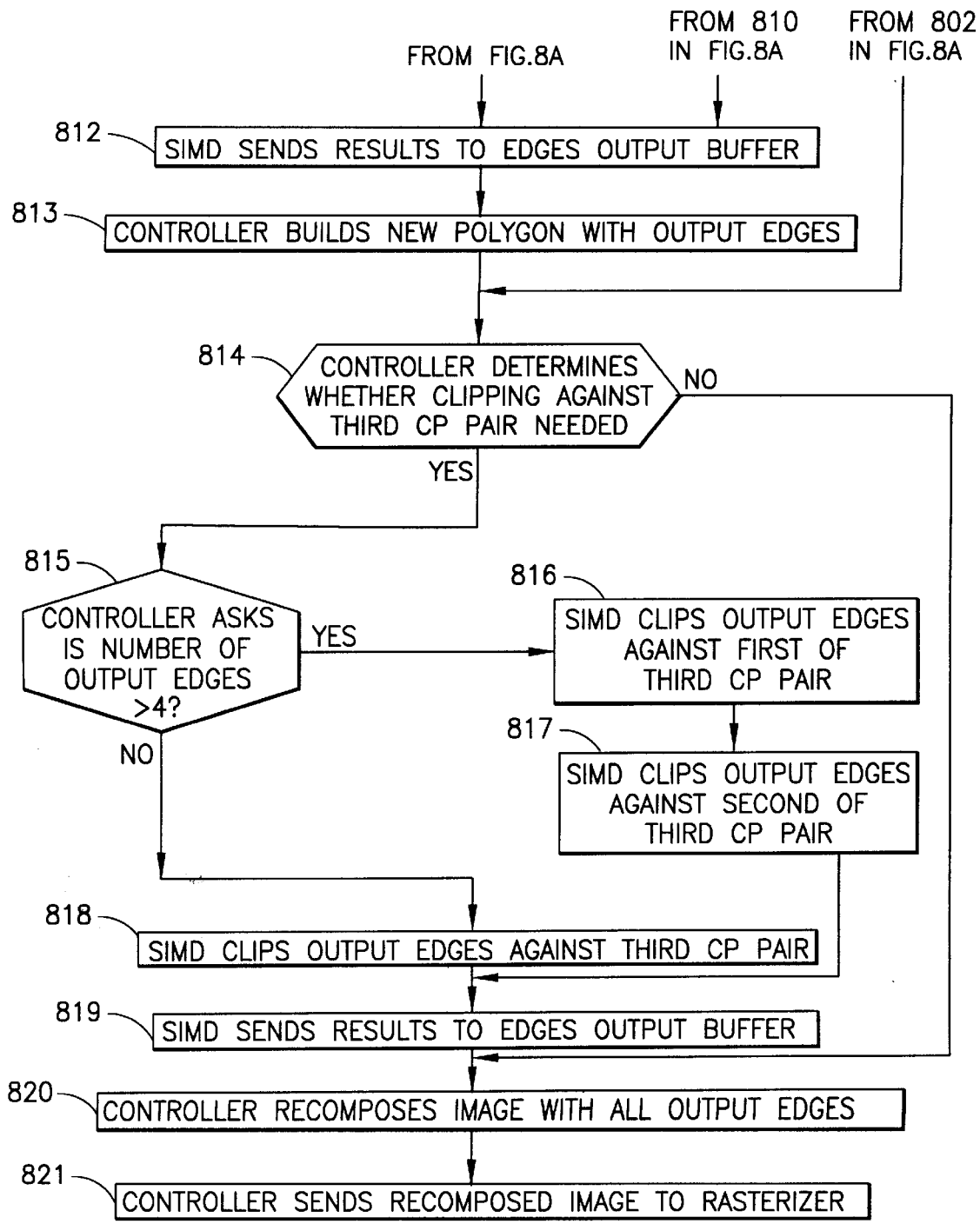

FIGS. 8A and 8B provide a representative process flow for clipping images with a SIMD computer having eight execution units. To begin the clipping process, the controller is initialized at step 800 and makes the determination as to whether any clipping of the image is necessary, at step 801. The outcodes of the prior art which are used to trivially reject or trivially accept triangles can be used for this first determination. Outcodes are defined for the entire polygon as the bit-wise AND of the outcodes for all vertices in the polygon:

$$oc\_poly = \prod_i oc_i.$$

In addition, paircodes are defined to indicate if the polygon is entirely contained between a pair of parallel clip planes:

pc_poly_x=!(oc_poly & x_left oc_poly & x_right)
pc_poly_y=!(oc_poly & y_bot oc_poly & y_top)
pc_poly_z=!(oc_poly & z_front oc_poly & z_back ), where x_left, x_right, y_bot, y_top, z_front, and z_back are the outcodes for the respective clip planes. Clipping against a particular clip plane is performed only if the corresponding polygon outcode is asserted. Therefore, in step 802 (as well as in steps 807 and 814, below), a determination is made as to whether clipping against a particular pair of clip planes is necessary. Clipping against a particular pair of parallel clip planes is performed only if the corresponding polygon paircode is not asserted. For step 802, the decision is whether clipping is necessary against a first clip plane pair, preferably the Z-plane CP pairs. If such clipping is unnecessary, the system moves on to step 807.

If it has been determined that clipping against the first clip plane pair is necessary, the controller breaks the triangle into its three edges at step 803 and feeds them to the SIMD execution units. In step 804 the six needed SIMD execution units clip the edges against a first clip plane (CP) pair. Due to the fact that the initial image component will necessarily be a triangle, it is known that the three edges can be processed in parallel, such that six execution units of the SIMD are operating at once, three units clipping against one plane of the first CP (e.g., left plane) and three units clipping against the clip plane parallel to the first CP (e.g., right plane). The SIMD units send the output edges to the edges output buffer at step 806.

Thereafter, the controller builds a new polygon, at step 806, utilizing the output edges which resulted from clipping at step 804 along the first CP pair. The controller next determines if clipping is necessary along a next pair of clip planes (for example, front and back clip planes), at step 807. If clipping is not necessary, the system moves on the step 814. If clipping is necessary along the next pair of clip planes, the controller checks whether the number of output edges of the new polygon is less than or equal to one half of the number of execution units, at step 808. In the illustrated example, the controller determines if the number of output edges is greater than 4. If the number of output edges is less than or equal to 4, then the controller sends the output edges for clipping against both of the second pair of parallel clip planes, in the execution units of the SIMD at step 811. If the number of edges is greater than four, then clipping is conducted at the SIMD execution units in two steps, 809 and 810, against one clip plane in the second pair and then against the parallel clip plane in the second pair. The SIMD engine sends the results of clipping against the second parallel pair to the output edges buffer at step 812.

Once again, the controller builds a new polygon using the output edges, at step 813, and determines if the new polygon must be clipped against the final set of clip planes (e.g., the top and bottom planes) at step 814. In the instance when clipping is not necessary, the controller recomposes the image and sends the recomposed image to the rasterizer, in steps 820 and 821. When clipping against the final CP pair is necessary, if the number of output edges exceeds 4, then two clipping steps are conducted at the SIMD execution units in steps 816 and 817. On the other hand, if the number of output edges is less than or equal to 4, then one clipping step, 819, is performed in the SIMD units to achieve the final clipping along the third and final pair of parallel clip planes. The SIMD units send the clipped output edges to the output edges file at step 819. Once the final clipping has been conducted, the controller recomposes the image with the final clipped output edges at step 820, and sends the recomposed image to the rasterizer at step 821.

The following pseudo-code describes how the polygon edges are clipped in parallel (i.e., at the same time) against two parallel clip planes:

```
Reset vertex list
Convert the polygon into edges
parbegin
    foreach (clip plane CP in CP pair)
        parbegin
            foreach (edge e in polygon)
                compute intersection of e with CP
                compute edge attributes at intersection
                clip edge at intersection point
            endfor
        parend
    endfor
parend
```

Another embodiment of the invention which may potentially optimize utilization of the SIMD engine first determines whether consecutive triangles in the list of input triangles have the same paircodes, such that those triangles must be clipped against the same clip planes. If the input triangles do have the same paircodes, all edges of those triangles may be batched together during clipping. While the batched edges may be processed together, it is necessary to keep track of the number of edges that belong to each triangle during clipping in order to facilitate recomposition of clipped edges into polygons for subsequent processing steps (e.g., against other CPs) and/or for output to the clipped edges buffer. Once all processing has been completed, the triangles are re-assembled from the clipped edges and output to the buffer. In this manner, the system may process as many edges as there are SIMD execution units, which may reduce the I/Os between the control processor and the SIMD engine, resulting in higher utilization of the SIMD engine and greater overall performance.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. In a computer graphics system having a controller and a plurality of single instruction multiple data execution units associated with said controller, a method for clipping a convex polygon comprising a computer graphic primitive against clip planes defining a clip volume comprising the steps of:

(a) assigning paircodes to each of said plurality of polygons;

(b) said controller decomposing a first of said polygons into a plurality of first input edges;

(c) said controller providing said first input edges to a plurality of single instruction multiple data (SIMD) execution units, wherein each of said plurality of first input edges is provided to one of said plurality of single instruction multiple data (SIMD) execution units;

(d) said plurality of SIMD execution units clipping each of said plurality of edges against a first pair of clip planes to generate a plurality of output edges;

(e) said controller providing said plurality of output edges to said plurality of SIMD execution units, wherein each of said plurality of output edges is provided to one of said plurality of SIMD execution units;

(f) said plurality of SIMD execution units clipping said plurality of output edges against a successive pair of clip planes to generate a plurality of successive output edges;

(g) repeating steps, (e) and (f) against all remaining successive clip plane pairs;

(h) said controller assembling said successive output edges into a clipped polygon and outputting said clipped polygon for rasterizing.

2. The method of claim 1 wherein said primitive comprises a plurality of convex polygons, further comprising the step of repeating steps (a) through (g) for each of said plurality of convex polygons comprising said primitive.

3. The method of claim 1 further comprising the step of said controller determining if clipping against said first pair of clip planes is necessary prior to providing said each of said plurality of first input edges to one of said plurality of execution units.

4. The method of claim 1 further comprising the step of said controller determining if clipping said output edges against each of said successive pairs of clip planes is necessary prior to providing each of said plurality of output edges to one of said plurality of execution units.

5. The method of claim 3 wherein said determining comprises assigning values to each of said first input edges; assigning values to each of said clip planes; and, comparing said input edge values to said clip plane values.

6. The method of claim 4 wherein said determining comprises assigning values to each of said output edges; assigning values to each of said clip planes; and, comparing said output edge values to said clip plane values.

7. The method of claim 1 further comprising the step of ensuring that successive clip plane pair do not intersect within the volume created by said output edges.

8. The method of claim 1 further comprising identifying more than one of said plurality of polygons having the same assigned paircode.

9. The method of claim 8 wherein said controller providing edges to execution units for clipping comprises batching said edges of said identified polygons and providing said batched edges for clipping.

10. The method of claim 1 further comprising the step of said controller determining whether the number of edges to be clipped exceeds the number of said execution units prior to said providing.

11. The method of claim 10 wherein said providing and clipping are repeated for each set of edges when said number of edges to be clipped exceeds the number of execution units.

* * * * *